(12) United States Patent
Lee

(10) Patent No.: US 7,317,329 B2
(45) Date of Patent: Jan. 8, 2008

(54) LOOKUP TABLE CIRCUIT

(75) Inventor: Cheng-Hung Lee, Taipei Hsien (TW)

(73) Assignee: Aten International Co., Ltd, Taipei Hsien (TW)

( * ) Notice: Subject to any disclaimer, the term of this patent is extended or adjusted under 35 U.S.C. 154(b) by 224 days.

(21) Appl. No.: 11/246,280

(22) Filed: Oct. 11, 2005

(65) Prior Publication Data

US 2007/0085513 A1    Apr. 19, 2007

(51) Int. Cl.
*H03K 19/173*    (2006.01)

(52) U.S. Cl. .............................. 326/38; 326/40; 326/46

(58) Field of Classification Search .................. 326/38, 326/4, 46
See application file for complete search history.

(56) References Cited

U.S. PATENT DOCUMENTS 6,847,229 B2 * 1/2005 New et al. ..................... 326/39

* cited by examiner

*Primary Examiner*—Daniel Chang
(74) *Attorney, Agent, or Firm*—Birch, Stewart, Kolasch & Birch, LLP

(57) ABSTRACT

The present invention provides a LUT circuit that can simultaneously determine the corresponding output values of a plurality of input values. The LUT circuit of the present invention includes a plurality of comparators, a plurality of selecting circuits and at least one table stored in a memory. This table is used to record the values of dependent variables of a certain function. A plurality of input values ($X_n$) are sent to the LUT circuit at the same time. The selecting circuits generates select signals based on the received input values. Then, the select signals are sent to the comparators for letting the comparators output the corresponding output values.

13 Claims, 3 Drawing Sheets

LOOKUP TABLE CIRCUIT

FIELD OF THE INVENTION

The present invention regards a lookup table circuit, and more particularly, a lookup table circuit that can simultaneously search many outputs.

BACKGROUND OF THE INVENTION

A lookup table (LUT) circuit is used in various fields to replace the duplicated calculation circuits. For example, a lookup table circuit is used in many computer related fields, such as computer graphics, image processing and analog or digital video processing, to convert one function to another function.

Typically, in a lookup table application, a table with calculated results of a certain function is stored in a memory first. Next, when executing the function, a LUT circuit is used to search this table to output a result value corresponding to an input value. Such LUT circuit applications may replace duplicated circuit structure to reduce the circuit area.

However, the typical LUT circuit can only search for one stored value at one time. In other words, a searching process has to be performed repeatedly for finding each stored value. The other function execution of the circuit cannot proceed until all corresponding stored values are found in the lookup table. Such a LUT circuit takes much time in the repeated searching process.

Therefore, a LUT circuit that can find more than one stored values at one time is very necessary.

SUMMARY OF THE INVENTION

Therefore, it is the main purpose of the present invention to provide a LUT circuit that can determine the corresponding output values of a plurality of input values simultaneously or at one time.

Another purpose of the present invention is to provide a LUT circuit that can receive a plurality of independent variables for searching at the same time.

Accordingly, the present invention provides a LUT circuit including a plurality of comparators, a plurality of selecting circuits and a memory with a result value table. The comparators are respectively coupled with the selecting circuits and the memory.

In an embodiment, the LUT circuit of the present invention may receive more than one input values, such as independent variables, at the same time. Then, each of the decode circuits generates a select signal based on one of the received input values. These select signals are sent to the comparators for outputting a corresponding output value, such as a dependent variable value from the plurality of the dependent variable values, based on the input values.

BRIEF DESCRIPTION OF THE DRAWINGS

The foregoing aspects and many of the attendant advantages of this invention will become more readily appreciated and better understood by referencing the following detailed description, when taken in conjunction with the accompanying drawings, wherein.

DETAILED DESCRIPTION OF THE PREFERRED EMBODIMENT

Figure 1:
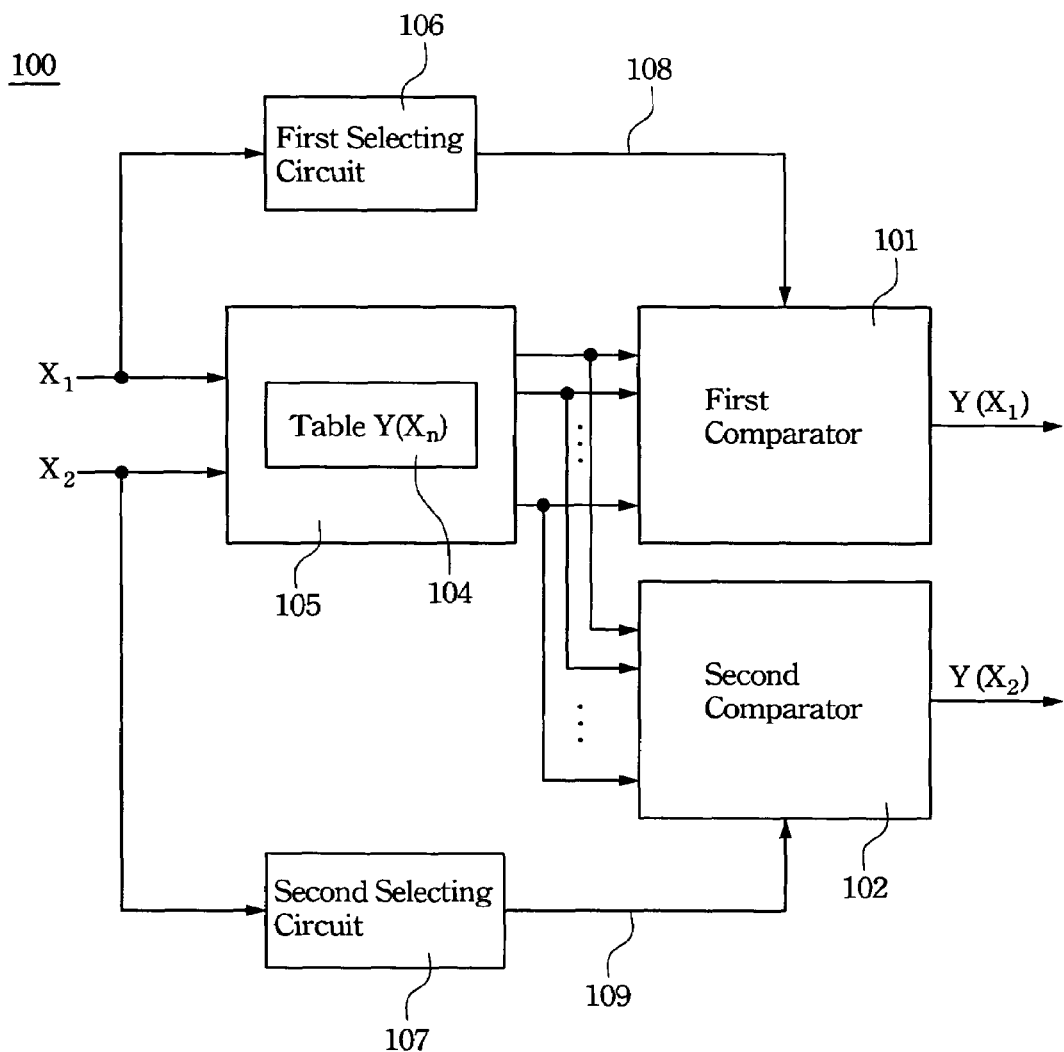
FIG. 1 illustrates a LUT circuit of the present invention.

FIG. 1 illustrates a LUT circuit of the present invention. According to this embodiment, this LUT circuit provides two independent variable values to search corresponding dependent variable values at the same time. However, in other embodiments, the LUT circuit of the present invention also may provide more than two independent variable values to search corresponding dependent variable values at the same time.

According to this embodiment, the LUT circuit 100 includes a first comparator 101, a second comparator 102, a first seelcting circuit, such as a first decode circuit 106, a seelcting circuit, such as a second decode circuit 107, and a memory 105. A table 104 holding dependent variable values of a certain function is stored in the memory 105.

The following is an example of the LUT circuit used in searching a function, in which the lookup table is defined as:

$$Y(X_n) = C \times X_n$$

$Y(X_n)$ is an output value as a dependent variable. $X_n$ is an input value as an independent variable. C is a constant. The dependent variable values corresponding to all possible independent variable values are collected and form the table 104 that is stored in the memory 105. The dependent variable values, $Y(X_n)$, are sequentially stored, such as form address 0 to address n−1, in the memory 105.

According to this embodiment, two independent variables ($X_1$ and $X_2$) are sent to the first and second decode circuit 106 and 107 respectively and the memory 105. Then, the memory 105 outputs a plurality of dependent varivable values corresponding to the dependent variable values. The first decode circuit 106 discriminate the value of the independent variables $X_1$ and sends a first select signal 108 to the first comparator 101. The second decode circuit 107 discriminate the value of the independent variables $X_2$ and sends a second select signal to the second comparator 102. The first select signal 108 may control the first comparator 101 to selectively output the corresponding dependent variable values, $Y(X_1)$ from the plurality of the dependent varivable values. The second select signal 109 may control the second comparator 102 to selectively output the corresponding dependent variable values, $Y(X_2)$ from the plurality of the dependent varivable values.

According to the present invention, a plurality of input values, i.e. independent variables ($X_n$) can be sent to the LUT circuit for searching corresponding dependent variable values at the same time or at one time. Therefore, the processing time may be much reduced.

Figure 2:
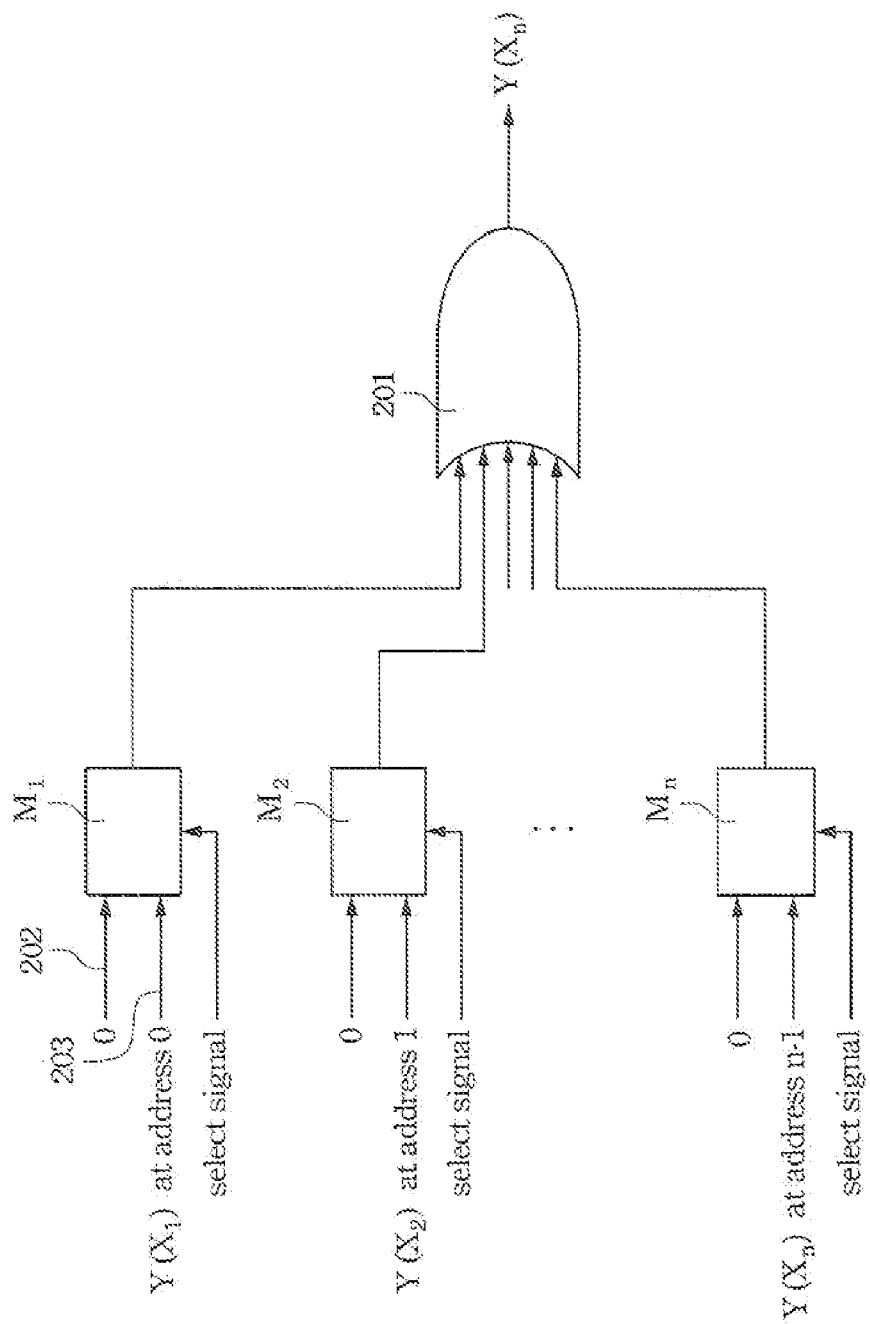
FIG. 2 is a schematic diagram of a comparator according to the present invention.

FIG. 2 is a schematic diagram of a comparator of the present invention used to selectively output a corresponding dependent variable value based on the control signal. Each comparator includes a plurality of multiplexers $M_1$, $M_2$ ... $M_n$ and an OR gate 201. The OR gate 201 receives the output values from these multiplexers so as to generate a result value. The number of the multiplexers equals the number of the dependent variables.

Each multiplexer, such as multiplexer $M_1$, includes two input ends 202 and 203. A zero value is sent to the multiplexer from the input end 202. The input end 203 is coupled to a special address of the memory 105 for letting the multiplexer receive the dependent variable stored at the special address. For example, the first multiplexer receives the dependent variable value stored at the address 0; the second multiplexer receives the dependent variable value stored at the address 1; the $N_{th}$ multiplexer receives the dependent variable value stored at the address n−1; and so on. The select signal (shown in the FIG. 1) based on the dependent variable value is used to switch the multiplexer to input the zero value or the dependent variable value.

In an embodiment, referring to FIGS. 1 and 2, after two independent variables ($X_1$ and $X_2$) are sent to the first and second decode circuit 106 and 107 respectively and the memory 105, two select signals 108 and 109, generated by the first decode circuit 106 and the second decode circuit 108, are sent to the first and second comparators 101 and 102 respectively, wherein the select signal 108 is relevant to the independent variable $X_1$ and the select signal 109 is relevant to the independent variable $X_2$. Therefore, after the comparator 101 receives the select signal 108, the select signal 108 may switch the multiplexer M1 involved with the independent variable $X_1$ to output the depend variable value, $Y(X_1)$. The other multiplexers are selected to output the zero values. Therefore, the OR gate 201 outputs this value, $Y(X_1)$.

Similarly, after the comparator 102 receives the select signal 109, the select signal 109 may switch the multiplexer M2 involved with the independent variable $X_2$ to output the depend variable value, $Y(X_2)$. The other multiplexers are selected to output the zero values. Therefore, the OR gate outputs this value, $Y(X_2)$. Accordingly, a plurality of independent variables ($X_n$) can be sent to the memory 105 for searching table 104 to find corresponding dependent variable values at the same time. Therefore, the searching speed may be increased and the required serching time is decreased so as to significantly improve the performance of the LUT circuir 100 and the chip efficiency.

Figure 3:
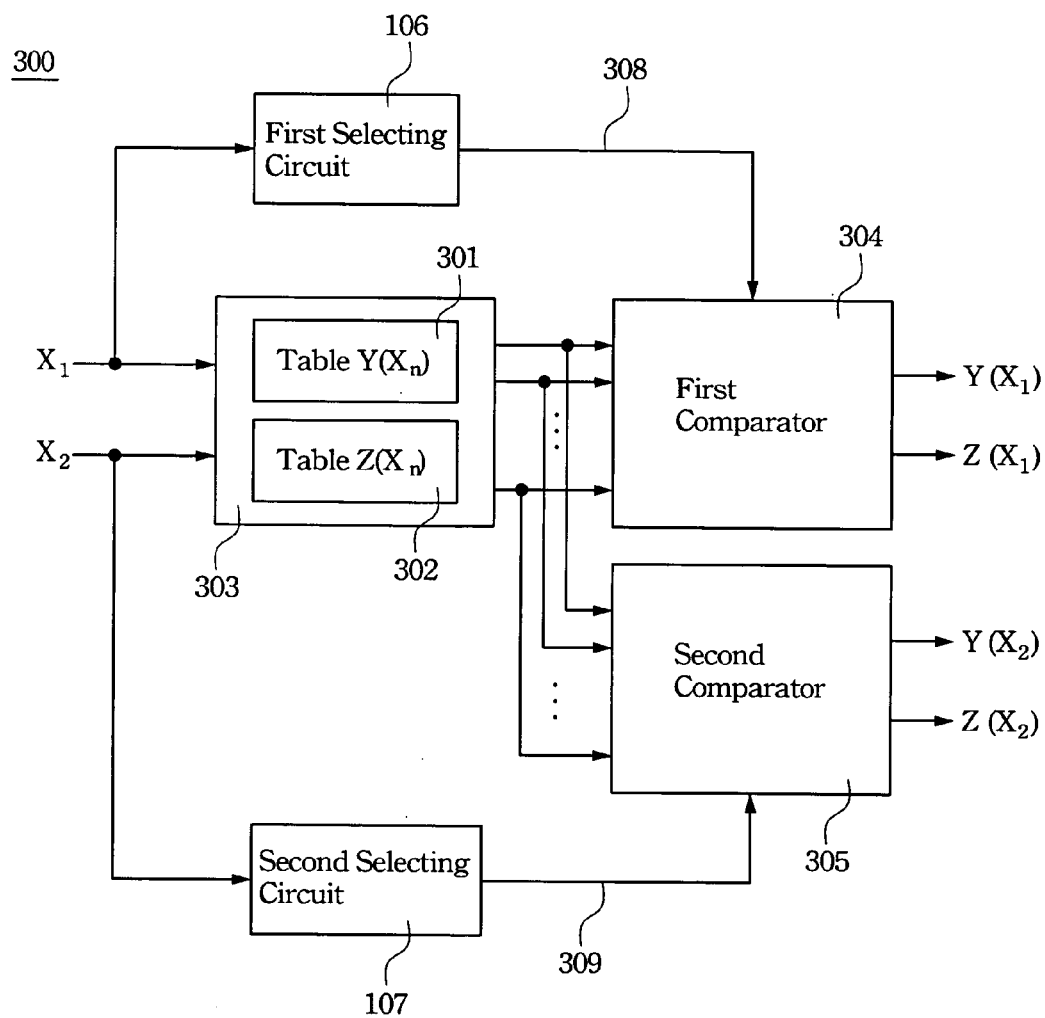
FIG. 3 illustrates a LUT circuit according to another embodiment of the present invention.

It is noticed that the LUT circuit of the present invention also may cooperate with more than one table including different dependent variables of different functions respectively. FIG. 3 is an example of such a LUT circuit 300, in which the lookup tables are defined as follows:

$$Y(X_n)=C \times X_n$$

$$Z(X_n)=C \times X_n$$

$Y(X_n)$ and $Z(X_n)$ are dependent variables respectively. $X_n$ is an independent variable. $C_1$ and $C_2$ are constants respectively. The dependent variable $Y(X_n)$ values corresponding to all possible independent variable ($X_n$) values are collected and form the table 301 that is stored in the memory 303. The dependent variable $Z(X_n)$ values corresponding to all possible independent variable ($X_n$) values are collected and form the table 302 that is stored in the memory 303. It is noticed that the two tables may be also stored in the different memory.

For example, there are two independent variables $X_1$ and $X_2$ for searching corresponding dependent variable values respectively stored in tables 301 and 302. Accordingly, the two independent variables $X_1$ and $X_2$ are sent to the memory 303 and the first selecting circuit 106 and the second selecting circuit 107 first. Then, the first selecting circuit 106 generates the first select signal 308 based on the independent variable $X_1$ and the second selecting circuit 107 may generate the second select signal 309 based on the independent variable $X_2$. The first select signal 308 switch the corresponding multiplexer in the first comparator 304 to output the corresponding dependent variable values, $Y(X_1)$ and $Z(X_1)$. The second select signal 309 switch the corresponding multiplexer in the second comparator 305 to output the corresponding dependent variable values, $Y(X_2)$ and $Z(X_2)$. In other words, two dependent variable can be simultaneously searched by one independent variables in this embodiment. Therefore, the searching speed may be increased so as to improve the chip efficiency.

In this second embodiment, the circuit structure of the comparators 304 and 305 are similar to the circuit structure of the comparators 101 and 102 shown in the first embiodiment. The main different is that the input end 203 of the multiplexer $M_1$ (as shown in the FIG. 2) is coupled to two special addresses of the memory 303 for receiving the dependent variables respectively stored at the two tables 301 and 302. Therefore, when the select signal selects the multiplexer $M_1$, two dependent variable values, such as $Y(X_1)$ and $Z(X_1)$, are outputted together.

Accordingly, the LUT circuit of the present invention includes a plurality of comparators, a plurality of selecting circuits and at least one table stored in a memory. This table is used to record the values of dependent variables of a certain function. According to the present invention, a plurality of independent variables ($X_n$) is sent to the LUT circuit at one time. The selecting circiuits generate select signals based on the received independent variables. Then, the select signals are sent to the comparators to let the comparators output the corresponding dependent variable values. The LUT circuit of the present invention can process the searching requiremets of a plurality of independent variables at the same time, therefore, the processing time may be much reduced.

As is understood by a person skilled in the art, the foregoing descriptions of the preferred embodiments of the present invention are an illustration of the present invention rather than a limitation thereof. Various modifications and similar arrangements are included within the spirit and scope of the appended claims. For example, the number of the input values at one time can be more than two. The scope of the claims should be accorded to the broadest interpretation so as to encompass all such modifications and similar structures. While preferred embodiments of the invention have been illustrated and described, it will be appreciated that various changes can be made therein without departing from the spirit and scope of the invention.

What is claimed is:

1. A lookup table circuit, for receiving more than one input values simultaneously and generating a plurality of output values, the lookup table circuit comprising:
   a memory for storing a table, wherein said table records a plurality of dependent variable values of a function;
   a plurality of selecting circuits for receiving the input variables and generate a select signal based on each of the input values; and
   a plurality of comparators, wherein each of said comparators is coupled with said memory and one of the selecting circuits, in response to said select signal from said selecting circuit so as to output one of the output values.

2. The lookup table circuit of claim 1, wherein each of the selecting circuits comprises a decode circuit.

3. A LUT circuit, comprising:
   at least one memory for storing at least one table, wherein said table records a plurality of dependent variable values of a function for providing a plurality of independent variable values to output corresponding dependent variable values;
   a plurality of decode circuits for receiving independent variables, wherein each of said decode circuits is used to generate a select signal based on a received independent variable; and
   a plurality of comparators, wherein each of said comparators is coupled with said memory and a corresponding decode circuit for receiving a select signal from said corresponding decode circuit to send out a corresponding dependent variable value.

4. The LUT circuit of claim 3, wherein each of said comparators includes a plurality of multiplexers, and each multiplexer receives one of the dependent variable values.

5. The LUT circuit of claim 4, wherein said multiplexers are switched by the select signal.

6. A LUT circuit for searching at least one table, wherein said table records a plurality of dependent variable values of a function and is stored in a memory, comprising:
   a plurality of selecting circuits for receiving a plurality of independent variables of said function and generating a plurality of select signals based on received independent variables respectively; and
   a plurality of comparators coupling with said memory and said selecting circuits respectively, said comparators receiving select signals for sending out corresponding dependent variable values.

7. The LUT circuit of claim 6, wherein each of the selecting circuits comprises a decode circuit.

8. The LUT circuit of claim 6, wherein each of said comparators includes a plurality of multiplexers, and each multiplexer receives one of the dependent variable values.

9. The LUT circuit of claim 8, wherein said multiplexers are switched by the select signal.

10. A LUT circuit, comprising:
    at least one memory for storing two tables, wherein said two table respectively record a plurality of dependent variable values of two different functions;
    a plurality of selecting circuits for receiving a plurality of independent variables of said two functions and generating a plurality of select signals based on received independent variables respectively; and
    a plurality of comparators coupling with said memory and said selecting circuits respectively, said comparators receiving select signals for sending out corresponding dependent variable values of said two functions.

11. The lookup table circuit of claim 10, wherein each of the selecting circuits comprises a decode circuit.

12. The LUT circuit of claim 10, wherein said comparator includes a plurality of multiplexers, and each multiplexer receives two dependent variable values of said two functions, respectively.

13. The LUT circuit of claim 12, wherein said multiplexers are switched by the select signal.

* * * * *